United States Patent
Sultenfuss et al.

(10) Patent No.: US 8,830,203 B2
(45) Date of Patent: *Sep. 9, 2014

(54) MULTI-ZONE TOUCHSCREEN ORIENTATION

(75) Inventors: Andrew T. Sultenfuss, Leander, TX (US); Stefan Peana, San Diego, CA (US)

(73) Assignee: Dell Products L.P., Round Rock, TX (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/533,830

(22) Filed: Jun. 26, 2012

(65) Prior Publication Data

US 2013/0342473 A1  Dec. 26, 2013

(51) Int. Cl.
  *G06F 3/045* (2006.01)
(52) U.S. Cl.
  USPC .......................................... 345/174; 345/173
(58) Field of Classification Search
  CPC ......... G06F 3/041; G06F 3/044; G06F 3/045; G06F 3/0346; G06F 3/0414; G06F 3/0488; G06F 3/03547; G06F 2203/04104; G06F 2203/04106
  USPC ............... 345/173–178; 178/18.01–18.09, 178/20.01–20.04
  See application file for complete search history.

(56) References Cited

U.S. PATENT DOCUMENTS

| | | | |
|---|---|---|---|
| 6,597,384 B1 | 7/2003 | Harrison | |
| 7,469,381 B2 | 12/2008 | Ording | |
| 8,115,753 B2 | 2/2012 | Newton | |
| 8,125,458 B2 | 2/2012 | Keam | |
| 2008/0266266 A1 | 10/2008 | Kent et al. | |
| 2010/0105443 A1 | 4/2010 | Vaisanen | |
| 2013/0342473 A1* | 12/2013 | Sultenfuss et al. | 345/173 |
| 2013/0342474 A1* | 12/2013 | Sultenfuss et al. | 345/173 |

* cited by examiner

*Primary Examiner* — Vijay Shankar
(74) *Attorney, Agent, or Firm* — Terrile, Cannatti, Chambers & Holland, LLP; Robert W. Holland

(57) ABSTRACT

A tablet portable information handling system touch screen display includes a touch surface that extends past the periphery of a display surface to accept touch inputs used to establish an orientation of images presented at the display surface. For example, thumb and palm touches at the touch surface outside the periphery of the display are analyzed to determine the orientation of the tablet information handling system so that images presented at the display align with the determined orientation.

20 Claims, 3 Drawing Sheets

MULTI-ZONE TOUCHSCREEN ORIENTATION

BACKGROUND OF THE INVENTION

1. Field of the Invention

The present invention relates in general to the field of information handling system touchscreen input/output devices, and more particularly to multi-zone touchscreen sensing at a portable information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Consumers and enterprises continue to adopt portable information handling systems to perform personal and business computing functions. One factor that has increased adoption of portable information handling systems is the relative ease with which an end user can interact with applications through a touchscreen display integrated in a portable information handling system. By having input devices presented at a touchscreen display users can interact with applications without a physical keyboard or mouse. For example, tablet information handling systems provide users with a convenient way to read content. The user selects the content with touches made at the touchscreen with one hand while holding the tablet information handling system with the other hand. Once desired content is presented at the touchscreen, the user browses the content with gestures made at the touchscreen with one hand while the other hand holds the tablet information handling system, such as a page-flipping gesture to have the next page of content presented at the touchscreen. If the user needs to make complex inputs to the tablet information handling system, such as writing a document or e-mail, the user can place the tablet information handling system on a table or stand and then use a wireless keyboard or other input device to interact with the tablet information handling system.

Touchscreen displays generally operate with a capacitive touch array disposed in a transparent cover placed over a liquid crystal display. The capacitive touch array detects touches with a touch controller interfaced with the array that reports the position of the touch to an operating system. The operating system responds to detected touches based upon the image presented at the liquid crystal display. For example, the operating system generates an image of a keyboard and presents the keyboard at a defined position of the display. If the touch controller reports a touch in an array position that corresponds to a keyboard key, the operating system accepts an input for the key. Applications running on a tablet information handling system coordinate use of the touchscreen through the operating system. For instance, games present images on the LCD that the user manipulates by touches at the images to perform game functions. As another example, a movie is presented at the LCD in a window with controls to manage presentation of the movie, such as buttons to play, pause or stop the movie that an end user activates with touches made at the touch screen.

Tablet information handling systems typically have a rectangular LCD that adapts to presentation of widescreen audiovisual information, such as movies. If an end user rotates the tablet information handling system, an accelerometer in the system typically detects a vertical orientation and orients the images presented at the LCD relative to the vertical orientation. End users take advantage of this functionality by rotating the tablet information handling system to present images to fill the LCD. One difficulty with the use of accelerometers to detect a vertical orientation is that tablet information handling systems placed on a flat surface can have an orientation relative to the end user that differs from a detected vertical orientation. The closer that a tablet information handling system display gets to a perpendicular orientation relative to the acceleration of gravity, the more difficult becomes the detection of a vertical orientation. A result of this difficulty is that presentation of images may flip between orientations when a user holds the tablet information handling system in a position that approaches having the display perpendicular to vertical. Arbitrary display orientation changes annoy and confuse end users.

SUMMARY OF THE INVENTION

Therefore a need has arisen for a system and method which supports presentation of images at an integrated touchscreen input device using multi-zone touch screen sensing.

In accordance with the present invention, a system and method are provided which substantially reduce the disadvantages and problems associated with previous methods and systems for presenting information at a touchscreen integrated in an information handling system. A periphery zone of a touch screen that extends out of the periphery of a display is monitored for touches that indicate selection by an end user of one or more management functions. In one embodiment, touches in the periphery zone are analyzed to determine an end user grasp and applied for establishing an orientation of images presented at a display.

More specifically, a tablet information handling system is built from plural processing components disposed in a portable housing, such as a CPU, memory, chipset and BIOS, which cooperate to process information under the control of an operating system. Visual information generated by the processing components is presented at an integrated touch screen display in a selected of plural orientations. An end user inputs information to the processing components by touching a touch screen portion of the touch screen display in a display zone that aligns with images presented in a display portion of the touch screen display. The end user can also input information in a periphery zone of the touch screen portion that is disposed outside of the periphery of the display portion. Inputs at the periphery portion support management functions through interactions with the BIOS, an embedded controller, a touch controller or firmware instructions distributed between these and other processing components. Management functions include selecting display and/or speaker settings, selecting a power state or selecting an orientation for presentation of images at the display portion. In one embodiment, touches at the periphery are analyzed to detect a grasp by an end user, such as a thumb-sized touch at opposing sides of the tablet information handling system, palm-sized touches near a thumb-sized touch, or a plurality of finger-sized touches.

The present invention provides a number of important technical advantages. One example of an important technical advantage is that a periphery zone of a touch screen display supports inputs to processing components independent of the operating system. Extending a touch screen footprint to beyond the footprint of a display does not substantially increase the system cost or power consumption while providing an addition tool for end users to manage tablet information handling system functions. Analysis of touches at the peripheral zone supports selection of an orientation for images presented at the tablet information handling system by determining an end user's relative orientation by the end users grasp of the periphery zone.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Functionality is provided through touches at an information handling system touch screen periphery zone, such as selection of an orientation to present images based upon a user grasp at the periphery zone. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
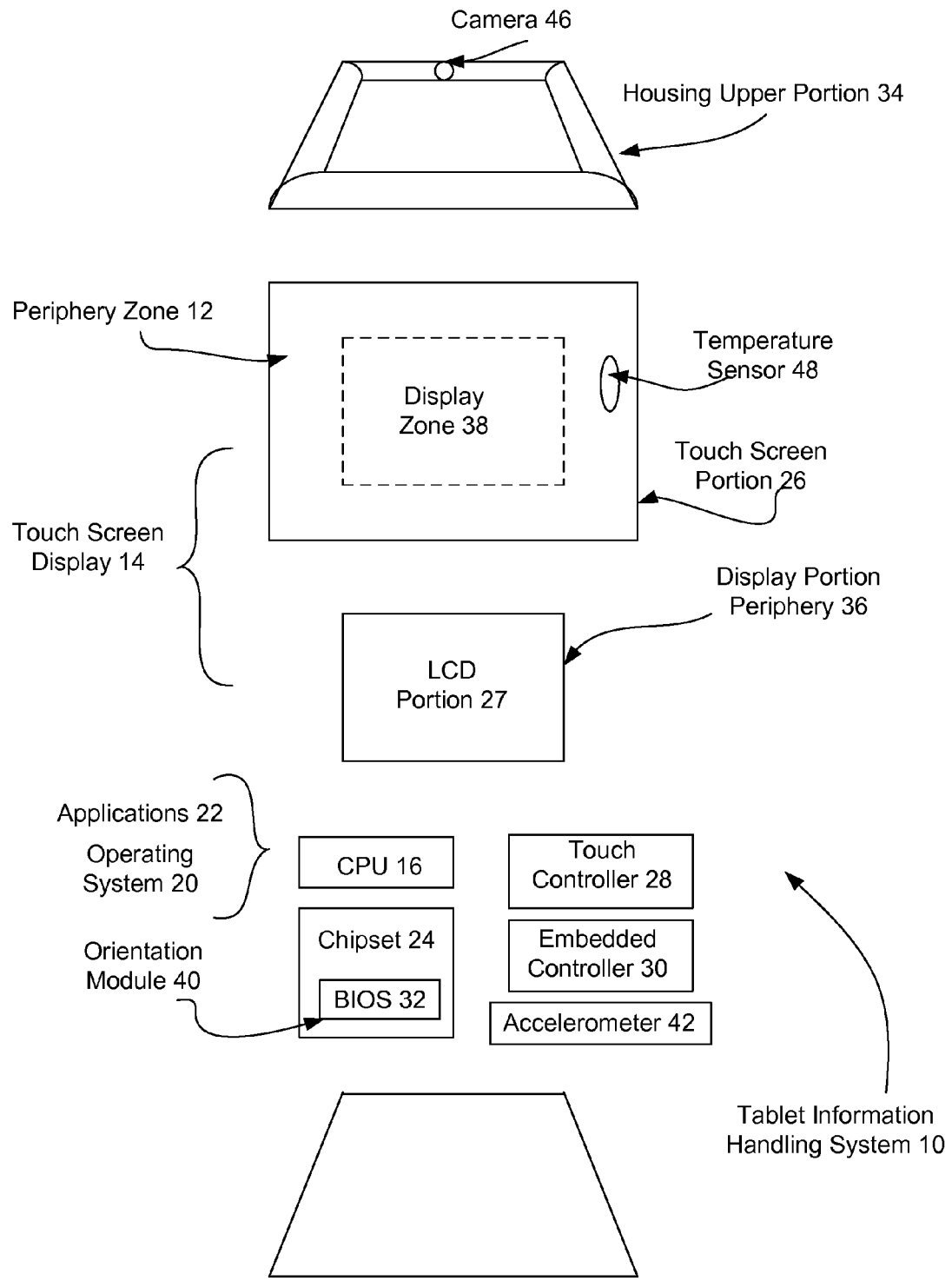
FIG. 1 depicts a blown-up view of an example embodiment of a tablet information handling system having functions provided by touches to a periphery zone of a touch screen display.

Referring now to FIG. 1, a blown-up view depicts an example embodiment of a tablet information handling system 10 having functions provided by touches to a periphery zone 12 of a touch screen display 14. Tablet information handling system 10 processes information with a central processor unit 16 (CPU) that performs instructions stored in a memory 18, such as dynamic random access memory (DRAM), a hard disk drive (HHD) or a solid state drive (SSD). For example, memory 18 stores an operating system 20 that executes on CPU 16 to support one or more applications 22. Information processed by CPU 16 is presented at touch screen display 14 with graphics logic executing on a processor of a chipset 24, which provides the information as pixel values to a liquid crystal display (LCD) portion 26 of touch screen display 14. A touch screen portion 26 of touch screen display 14 rests over LCD portion 27 and detects touches, such as with a capacitive or resistive sensing array. A touch controller 28 interfaced with touch screen portion 26 determines the location of touches and provides the location to operating system 20 for use, such as in the same manner as other I/O information communicated by an embedded controller 30 and BIOS 32 to operating system 20. For example, an application 22 generates visual information for presentation at LCD portion 27 so that an end user interacts with the application by touch inputs at the image. Touch controller 28 determines the touch position and provides the position to embedded controller 30 and, in turn, to the operating system 20 for use as input to the application 22. In alternative embodiments, alternative hardware, firmware and software configurations may be used to coordinate translation of touches at touch screen portion 26 into inputs for operating system 20 and/or application 22.

Tablet information handling system 10 has a main housing that supports assembled components disposed under touch screen display 14 and a housing upper portion 34 that secures the components and touch screen display to housing 32. Alternatively, touch screen display 14 rests over housing 32 and is held in position with coupling devices from below so that touch screen portion 26 forms the upper surface of tablet information handling system 10. LCD portion 27 of touch screen display 14 presents images within a periphery 36. Touch screen portion 26 covers LCD portion 27 so that touches within a display zone 38 fall inside the periphery 36 of LCD portion 27 and touches in a periphery zone 12 fall outside the periphery 36 of LCD portion 27. During operations, LCD portion 27 presents images in one of plural orientations based upon the orientation of LCD portion 27 relative to an end user. An orientation module 40 determines the orientation for presenting images with instructions running as part of BIOS 32 or other logic with the graphics system. One conventional way for orientation module 40 to determine a display orientation is by reference to an accelerometer 42, which detects a vertical axis based upon the acceleration of gravity. If an end user rotates housing 32, orientation module 40 rotates the orientation of the image presented at LCD portion 27 to maintain the orientation along the vertical axis detected by accelerometer 42.

Tablet information handling system 10 interacts with an end user under the management of an operating system 20, which performs operating system functions. Some non-operating system functions are managed by firmware, such as instructions executing in BIOS 32, based upon inputs made by an end user with buttons, such as power buttons, speaker volume buttons or display brightness buttons. Some management functions are performed with and some without the operating system. For example, operating system 20 presents a user interface to which end users make inputs for performing a management function, however, the management function is performed by firmware instructions running in chipset 24, in embedded controller 30 or touch controller 28. Some examples of management functions include setting a power consumption state with a power manager 44 running on embedded controller 30, such as an on, standby, suspend and off power states, setting a display brightness, setting a speaker volume and orienting, and setting display resolution and orientation.

A multi-zone touch screen portion 26 provides enhanced end user control of inputs to tablet information handling system 10 by accepting inputs in periphery zone 12 that are independent or interdependent of images presented by operating system 20 in display zone 38. In the example embodiment, touch screen portion 26 is a single piece of glass that has a surface area of greater than the surface area of the LCD portion 26 over which touch screen portion 26 rests. Touch sensing in display zone 38 is mapped to images presented on LCD portion 27 in a conventional manner; however, touch sensing in periphery zone 12 is also activated to provide non-operating system and management functions. In the example embodiment, periphery zone 12 provides touch sensing at an equal distance outside of the periphery of display zone 38. In alternative embodiments, periphery zone 12 provides different amounts of touch sensing on different sides of display zone 38 based upon the placement of touch sensing portion 26 relative to display portion 27. For instance, an off center placement of touch screen portion 26 relative to LCD portion 27 allows most or all of periphery zone 12 to fall on one side of touch screen display 14. In one embodiment, portions of periphery zone 12 cross into display zone 38 so that touch sensing in that shared zone provides both display zone and periphery zone touching.

In operation, an end user interacts with operating system 20 and applications 22 through touches at display zone 38 based upon images presented at LCD portion 27. The end user also interacts with non-operating system and management functions of tablet information handling system 10 through touches at periphery zone 12. Examples of interactions supported through periphery zone 12 include power management by power manager 44, display setting management by BIOS 32, speaker setting management by BIOS 32, and image orientation management by orientation module 40. Although power manager 44, BIOS 32 and orientation module 40 are depicted as firmware modules running on processors in chipset 24, in alternative embodiments they may run on alternative hardware, such as embedded controller 30 or touch controller 28, or may run as software supported by CPU 16. Orientation module 40 establishes the orientation of an image presented at LCD portion 27 relative to housing 32 based upon intentional or unintentional inputs made at periphery zone 12; however, orientation module 40 may include inputs from other sensors to aid in selection of an image orientation, such as accelerometer 42, camera 46 and temperature sensors 48.

Figure 2:
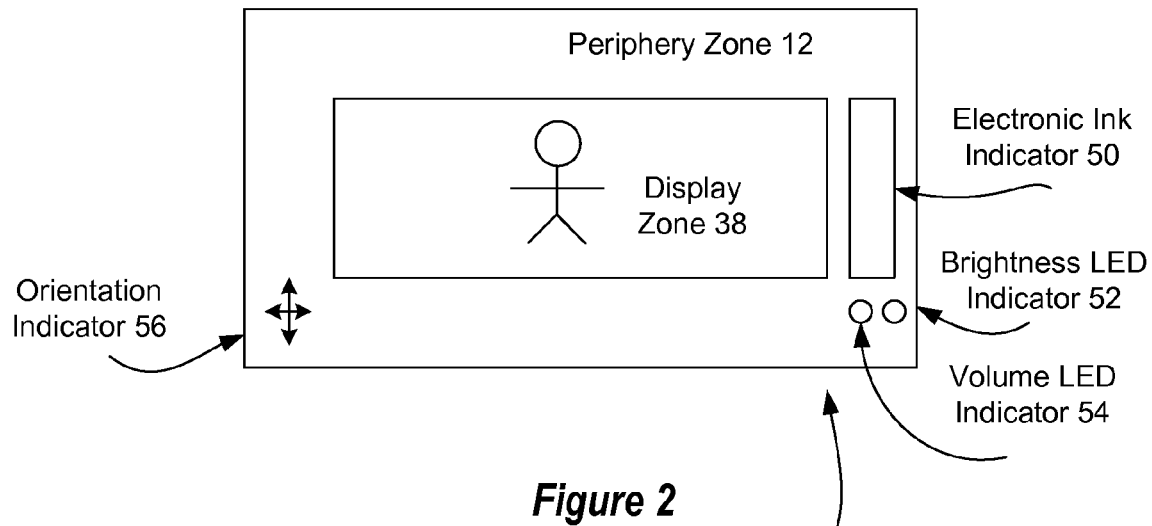
FIG. 2 depicts the tablet information handling system with an image presented in a first orientation.

Referring now to FIG. 2, the tablet information handling system 10 is depicted with an image presented in a first orientation. Display zone 38 aligns over LCD portion 27 to support end user inputs. Periphery zone 12 surrounds display zone 38 to accept non-operating system and management inputs. Indicators are provided at periphery zone 12 to aid end user interaction. For example, an electronic ink display or LEDs 52 provide management information to an end user, such as a display or volume setting with a bar graph or a location in periphery zone 12 where the end user can select inputs. As an example in the example embodiment of FIG. 2, a bar graph electronic ink display 50 presents a display brightness setting or a speaker volume setting based upon an end user selection of a display LED 52 or a speaker LED 54. If the end user desires to set display brightness, the end user touches periphery zone 12 at display brightness LED 52 and then touches with a sliding motion at electronic ink display 50 to adjust the brightness by moving the position of the bar graph. Indicators 50-54 are managed by BIOS 32 or other firmware interfaced with periphery zone 12. In one alternative embodiment, an indicator is provided with an electronic ink display to allow power management through touches at periphery zone 12. For example, an off and a standby indication is presented when tablet information handling system 10 is in an on state so that power state changes are commanded through periphery zone 12 when power is available at touch controller 28 and embedded controller 30. If tablet information handling system is in an off state so that power is not available to detect inputs at periphery zone 12, then the electronic ink is cleared. In another alternative embodiment, an orientation indicator 56 is presented to allow an end user to touch at an arrow to automatically changing the display orientation to the direction of the arrow.

Figure 3:
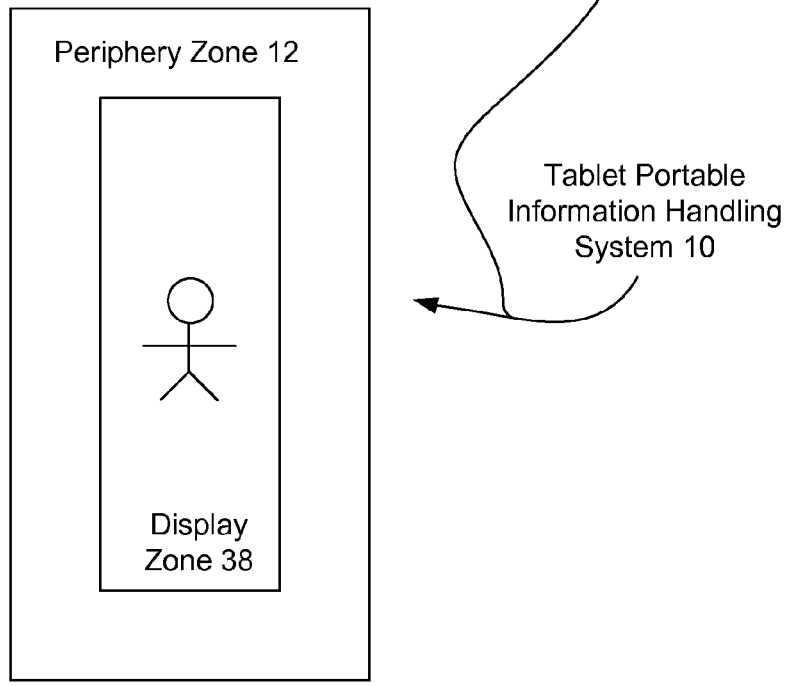
FIG. 3 depicts the tablet information handling system with the image presented in a second orientation.

Referring now to FIG. 3, the tablet information handling system 10 is depicted with the image presented in a second orientation. The image orientation changes based upon an automated analysis as set forth below or a manual end user selection. An orientation indicator 56 provides an arrow for each direction that an orientation selection is available. An end user touches the direction desired in the periphery zone to command an orientation change. In one embodiment, the image orientation changes to the selected direction and the indicators presented within periphery zone 12 remain in the same position, as depicted by FIG. 3. Alternatively, indicators presented in periphery zone 12 also realign to the newly selected orientation. In another alternative embodiment, operating system 20 coordinates inputs through periphery zone 12 by presenting images in display zone 38 that indicate a location of periphery zone 12 for making an input to perform a function.

Figure 4:
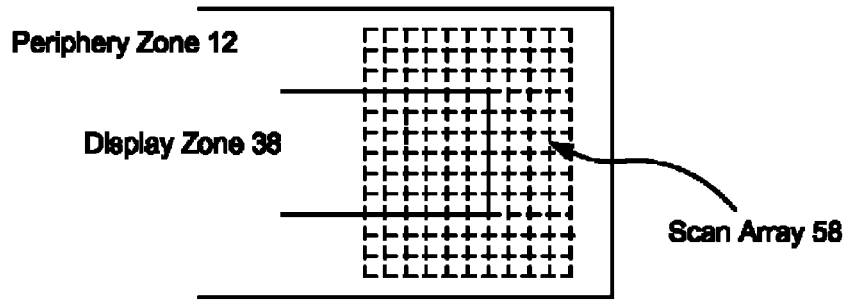
FIG. 4 depicts an example embodiment of scan array density for a touch screen across display and periphery zones.

Referring now to FIG. 4, an example embodiment is depicted of a scan array density for a touch screen portion 26 across display and periphery zones 38 and 12. In the depicted embodiment, touch screen portion 26 is a single piece of transparent material with a scan array 58 having a footprint that is greater than the footprint of a display LCD portion 27 disposed beneath touch screen portion 26. Although the scan array density available in the display zone 38 and periphery zone 12 are the same, a lesser scan density may be used for periphery zone 12 to save power. The reduced scan density may implement during reduced power states or may be hardwired. Further, scan array 58 may include different touch detection settings and methods for display zone 38, which uses precise touch measurements, and periphery zone 12, which operates with less precise inputs. For example, display zone 38 may have a greater capacitive sense gain that allows detection of smaller touches than a higher capacitive sense gain in periphery zone 12. Alternatively, periphery zone scan array sensors may use resistive detection of touches while display zone scan array sensors use capacitive detection.

Figure 5:
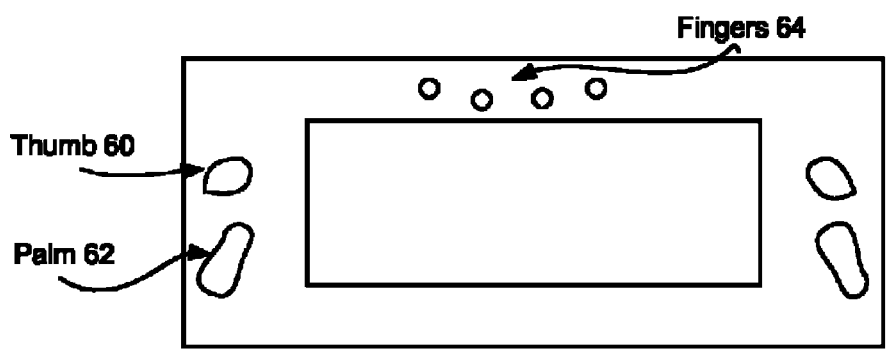
FIG. 5 depicts touches at a periphery zone that are analyzed to determine an orientation for presenting images.

Referring now to FIG. 5, touches at a periphery zone 12 are depicted that are analyzed to determine an orientation for presenting images. In the example embodiment, orientation module 40 analyzes touches at periphery zone 12 to identify touches associated with an end user grasp of tablet information handling system 10 and, in response to detection of a grasp, aligns the image presented at LCD portion 27 with an upright position associated with the detected grasp. One type of grasp that indicates an orientation is a thumb touch 60 at each of opposing sides of periphery zone 12. For example, orientation module 40 analyzes the size, shape and direction of the touch to determine an orientation for presenting images. In addition, if a palm touch 62 is detected then further confirmation of the orientation is provided. Another type of grasp is a fingers grasp indicated by finger position touch 64, which indicates a back hand grasp with the fingers positioned at the upward orientation. In alternative embodiments, alternative grasps may be used to detect orientation. In one embodiment, orientation module 40 tracks end user usage patterns to model touches associated with predetermined orientations.

In combination with touches to the periphery zone 12 that indicate a grasp, orientation module 40 may use other sensor inputs to determine orientation. For example, touches that indicate a grasp are combined with indications of an accelerometer 42 to determine an orientation for presenting images. In particular, grasp touches provide valuable inputs for determining orientation when tablet information handling system 10 is placed in a flat orientation so that accelerometer sensor results are not conclusive as to orientation. In another embodiment, grasp touches are used in combination with images captured by camera 46 to determine an orientation relative to the end user, such as by analyzing the image to have the orientation set as the vector from the end user's chin to eyes. In yet another embodiment, temperature sensors 48 confirm a grasp touch by the increase in temperature proximate to the grasp.

Figure 6:
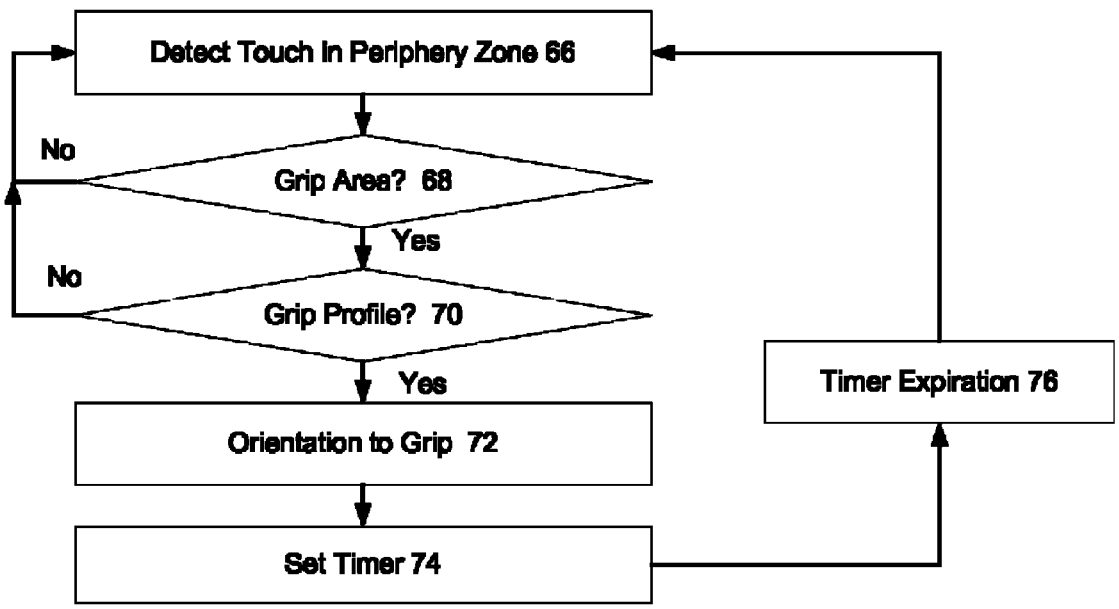
FIG. 6 depicts a flow diagram of a process for determining image presentation orientation from grasp touches in a periphery zone.

Referring now to FIG. 6, a flow diagram depicts a process for determining image presentation orientation from grasp touches in a periphery zone. At step 66, a touch is detected in a periphery zone 12. At step 68, a determination is made of whether the detected touch is in an end user grasp area. If not, the process returns to step 66. If the detected touch is in the grasp area, the process continues to step 70 to determine if the detected touch matches a grasp profile. The grasp profile includes preloaded profiles expected from end users or profiles generated by analysis of usage patterns at the tablet information handling system. If the detected touch does not match a grasp profile, the process returns to step 66. If the detected touch does match a grasp profile, the process continues to step 72 to establish the orientation of images presented at the display with the orientation indicated by the grasp. At step 74, a timer is set to prevent grasp-orientation changes due to hunting. At step 76, upon expiration of the timer, the process returns to step 66 to resume analysis of touches to determine orientation for presenting images.

Although the present invention has been described in detail, it should be understood that various changes, substitutions and alterations can be made hereto without departing from the spirit and scope of the invention as defined by the appended claims.

What is claimed is:

1. An information handling system comprising:
 a housing;
 a processor disposed in the housing and operable to execute instructions;
 memory interfaced with the processor and operable to store the instructions;
 a touch screen display integrated with the housing and interfaced with the processor, the touch screen display having a display portion operable to present information as images in at least a first and second orientation and a touch portion operable to detect touches, the touch portion having a first zone that overlaps the display portion and a second zone that extends outside of a periphery of the display portion;
 a touch controller interfaced with the touch portion and operable to detect touches in the first and second zones; and
 an orientation module operable to analyze touches in the second zone to determine whether to present the images in the first or second orientation.

2. The information handling system of claim 1 wherein the orientation module commands a first orientation in response to a touch in the second zone proximate a first indicator and a second orientation in response to a touch in the second zone proximate a second indicator.

3. The information handling system of claim 1 wherein the orientation module analyzes touches at the second zone to detect a user grasp of the information handling system and applies the detected user grasp to select the first or second orientation.

4. The information handling system of claim 3 further comprising an accelerometer operable to detect a vertical orientation, the orientation module analyzing the vertical orientation detected by the accelerometer in combination with the detected user grasp to determine whether to present the images in the first or second orientation.

5. The information handling system of claim 3 further comprising one or more temperature sensors disposed proximate the second zone, the orientation module analyzing temperatures sensed by the temperature sensors to confirm a user grasp.

6. The information handling system of claim 3 further a camera operable to capture images proximate the display, the orientation module analyzing the captured images in combination with the detected user grasp to select the first or second orientation.

7. The information handling system of claim 3 wherein the touches at the second zone comprise a pattern indicative of palms of a user pressed against opposing sides of the second zone.

8. The information handling system of claim 3 wherein the touches at the second zone comprise a pattern indicative of thumbs pressed against opposing sides of the second zone.

9. The information handling system of claim 1 wherein the first zone comprises capacitive touch sensors and the second zone comprises resistive touch sensors.

10. The information handling system of claim 1 wherein the first zone comprises capacitive touch sensors having a first gain and the second zone comprises capacitive touch sensors have a second gain, the second gain greater than the first gain.

11. A method for orienting images presented at an information handling system, the method comprising:
 presenting an image at a display integrated in a housing;
 detecting touches at a touch screen of the display, the touches at a periphery zone of the touch screen, the periphery zone extending past a periphery of the display; and
 analyzing the touches at the periphery zone to determine an orientation for presenting the image at the display.

12. The method of claim 11 wherein analyzing the touches further comprises analyzing the touches as first and second thumbs grasping the touch screen at opposing sides of the housing.

13. The method of claim 11 wherein analyzing the touches further comprises analyzing the touches as first and second palms placed against the touch screen at opposing sides of the housing.

14. The method of claim 11 further comprising:
detecting an acceleration with an accelerometer integrated in the housing; and
analyzing the acceleration in combination with the touches at the periphery zone of the display to determine an orientation for presenting the image at the display.

15. The method of claim 11 further comprising:
detecting a temperature with a temperature sensor disposed proximate the periphery zone; and
analyzing the temperature in combination with the touches at the periphery zone of the display to determine an orientation for presenting the image at the display.

16. The method of claim 11 wherein the touch screen comprises a first array density for detecting touches proximate the display and a second array density for detecting touches in the periphery zone.

17. A touch screen display comprising:
a display operable to present information as images, the display having a periphery;
a single touch surface disposed over the display and operable to detect touches, the touch surface extending past at least a portion of the display periphery;
a touch controller interfaced with the touch surface and operable to distinguish between touches at the touch surface within the display periphery and outside the display periphery; and
an orientation module operable to analyze touches outside the display periphery to determine whether to present the images in a first or second orientation.

18. The touch screen display of claim 17 further comprising:
an indicator disposed outside the display periphery;
wherein the touch controller is further operable to detect touches relative to the indicator and the orientation module is further operable to present the image in a first or second orientation responsive to touches relative to the indicator.

19. The touch screen display of claim 17 wherein the orientation module is further operable to determine thumb touches and to orient the images relative to the thumb touches.

20. The touch screen display of claim 17 wherein the orientation module is further operable to determine palm touches and to orient the images relative to the palm touches.

* * * * *